(12) United States Patent
Shirokoshi

(10) Patent No.: US 11,732,791 B2
(45) Date of Patent: Aug. 22, 2023

(54) STRAIN WAVE GEARING

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEM INC., Tokyo (JP)

( * ) Notice: Subject to any disclaimer, the term of this patent is extended or adjusted under 35 U.S.C. 154(b) by 0 days.

(21) Appl. No.: 17/289,066

(22) PCT Filed: Jan. 8, 2020

(86) PCT No.: PCT/JP2020/000326
§ 371 (c)(1),
(2) Date: Apr. 27, 2021

(87) PCT Pub. No.: WO2021/140592
PCT Pub. Date: Jul. 15, 2021

(65) Prior Publication Data
US 2022/0333673 A1 Oct. 20, 2022

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01); *F16H 2049/003* (2013.01)

(58) Field of Classification Search
CPC .................................................... F16H 49/001
(Continued)

(56) References Cited

U.S. PATENT DOCUMENTS 4,974,470 A * 12/1990 Ishikawa ............... F16H 49/001
74/640
10,788,114 B2 * 9/2020 Ishikawa ............. F16H 55/0833
(Continued)

FOREIGN PATENT DOCUMENTS

JP        S6275153 A    4/1987
JP        S6362935 A    3/1988
(Continued)

OTHER PUBLICATIONS

International Search Report (PCT/ISA/210) and Written Opinion (PCT/ISA/237) dated Mar. 17, 2020, by the Japanese Patent Office as the International Searching Authority for International Application No. PCT/JP2020/000326.

*Primary Examiner* — Ha Dinh Ho
(74) *Attorney, Agent, or Firm* — Buchanan Ingersoll & Rooney PC

(57) ABSTRACT

An externally toothed gear of a cup-type strain wave gearing has external teeth, the tooth profile of which gradually changes in the tooth-trace direction. The external teeth are formed with an external teeth portion capable of meshing with internal teeth of an internally toothed gear, a first external teeth extension portion and a second external teeth extension portion, in which the first and second external teeth extension portions do not mesh with the internal teeth. The second external teeth extension portion has a narrowing tapered tooth profile so that the second external teeth extension portion serves as a guide when the external teeth is inserted into the internal teeth. The work of assembling the externally toothed gear in the internally toothed gear is made easier.

7 Claims, 6 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 10,788,115 B2* | 9/2020 | Ishikawa | ............. | F16H 55/0833 |
| 2007/0266819 A1* | 11/2007 | Ishikawa | ............. | F16H 55/0833 |
| | | | | 475/180 |
| 2009/0044651 A1* | 2/2009 | Yamamori | ............. | B62D 5/008 |
| | | | | 74/461 |
| 2010/0319484 A1* | 12/2010 | Kanai | ................. | F16H 55/0833 |
| | | | | 409/10 |
| 2011/0154928 A1* | 6/2011 | Ishikawa | ............. | F16H 55/0833 |
| | | | | 74/461 |
| 2011/0237382 A1* | 9/2011 | Ishikawa | ............. | F16H 55/0833 |
| | | | | 475/180 |
| 2014/0047937 A1* | 2/2014 | Ishikawa | ............... | F16H 49/001 |
| | | | | 74/412 R |
| 2014/0251048 A1* | 9/2014 | Ishikawa | ............... | F16H 49/001 |
| | | | | 74/413 |
| 2017/0159789 A1* | 6/2017 | Ishikawa | ............. | F16H 55/0833 |
| 2018/0347679 A1* | 12/2018 | Ishikawa | ............. | F16H 55/0833 |
| 2019/0003569 A1* | 1/2019 | Ishikawa | ............. | F16H 55/0833 |

FOREIGN PATENT DOCUMENTS

| | | |
|---|---|---|
| JP | H0291238 U | 7/1990 |
| JP | H0552404 U | 7/1993 |
| JP | 2017044287 A | 3/2017 |
| WO | 2017122362 A1 | 7/2017 |

* cited by examiner

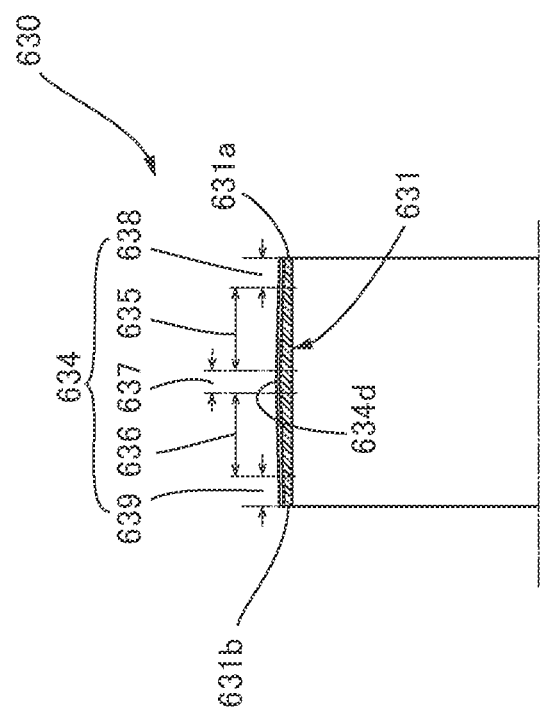

STRAIN WAVE GEARING

TECHNICAL FIELD

The present invention relates to a strain wave gearing provided with a flexible externally toothed gear, and particularly relates to an externally toothed gear provided with an external tooth shape, facilitating assembly in an internally toothed gear.

BACKGROUND ART

A cup-type strain wave gearing provided with a cup-shaped externally toothed gear, a top-hat-type strain wave gearing provided with a top-hat-shaped externally toothed gear, and a flat-type strain wave gearing provided with a cylindrical externally toothed gear are known as strain wave gearings. Externally toothed gears, which are constituent components of such strain wave gearings, are generally manufactured by cutting. Externally toothed gears are also known to be manufactured using a molding die. Patent Document 1 indicates that an externally toothed gear in which external teeth are integrally formed is manufactured using a die provided with a cavity portion corresponding to the external teeth of the externally toothed gear (claim 5, etc., of said document). Patent Document 2 indicates that a flexspline (externally toothed gear) is a resin molded article.

There have also been proposals of externally toothed gears of strain wave gearings provided with a tooth profile that avoids interference with the internal teeth of the internally toothed gear and that can improve tooth contact, in consideration for the flexed state of the externally toothed gear in the tooth-trace direction. For example, Patent Document 3 discloses a strain wave gearing provided with a tapered external tooth profile, and Patent Document 4 discloses an external tooth profile in which tooth thickness gradually decreases along the tooth trace from an open-end side of a cup-shaped externally toothed gear.

PRIOR ART LITERATURE

Patent Documents

Patent Document 1: JP 1988-62935 A
Patent Document 2: JPU 1993-52404 A
Patent Document 3: JP 1987-75153 A
Patent Document 4: JP 2017-44287 A

SUMMARY OF THE INVENTION

Problems to be Solved by the Invention

When an externally toothed gear of a strain wave gearing is manufactured as a molded article using a molding die, a level difference, etc. (parting line mark), is formed in an external peripheral surface of the externally toothed gear, in a location corresponding to a parting line of the molding die. Therefore, it is necessary, inter alia, to design the die so that the position of the parting line is set apart from an external teeth formation portion of the externally toothed gear. When the externally toothed gear is inserted into an internally toothed gear, the parting line mark must not be an obstruction to the insertion work.

Furthermore, in order to remove the molded article from the molding die, the molded article is given a draft. For example, in the case of a cup-shaped externally toothed gear, an external tooth shape is adopted in which the tooth profile size gradually decreases along the tooth trace toward the die removal direction. In the case of a molded article of an externally toothed gear provided with a tooth profile (three-dimensional tooth profile) in which the tooth profile changes along the tooth trace in this manner, inserting and assembling the externally toothed gear in the internally toothed gear is difficult from the side having the larger tooth profile size. This problem also occurs in the case of an externally toothed gear manufactured by machining.

No attention has been directed on the above-described problem in externally toothed gears of strain wave gearings in the prior art, nor have any proposals been made to solve such a problem.

In view of such matters, an object of the present invention is to provide a strain wave gearing designed such that an externally toothed gear provided with a tooth profile (three-dimensional tooth profile) that gradually changes along the tooth trace can be assembled in an internally toothed gear more easily. Another object of the present invention is to provide a strain wave gearing with which it is possible to resolve the problem of difficulty in assembling an externally toothed gear in an internally toothed gear due to a parting line mark in the molded article when the externally toothed gear is a molded article.

Means of Solving the Problems

To solve the above-described problems, the present invention provides a strain wave gearing comprising: a rigid internally toothed gear; a flexible externally toothed gear disposed coaxially on an inner side of the internally toothed gear; and a wave generator fitted into an inner side of the externally toothed gear, wherein external teeth of the externally toothed gear include an external teeth portion capable of meshing with internal teeth of the internally toothed gear and an external teeth extension portion formed in a position set apart from the internal teeth in a tooth-trace direction. The external teeth portion has a three-dimensional tooth profile of which the tooth profile shape changes along the tooth-trace direction, and the external teeth extension portion extends in the tooth-trace direction at least as a continuation of a first end, which is one end of the external teeth portion in the tooth-trace direction. At least an addendum circle diameter in the external teeth extension portion gradually decreases from the first end of the external teeth portion to a distal end of the external teeth extension portion so that the external teeth extension portion will serve as a guide when the external teeth are inserted into the internal teeth.

In the externally toothed gear, the external teeth extension portion does not mesh with the internal teeth of the internally toothed gear. Additionally, the narrowing external teeth extension portion, in which the addendum circle diameter gradually decreases, is formed in one end of the external teeth of the externally toothed gear. The external teeth of the externally toothed gear gradually change in tooth profile along the tooth-trace direction. The tooth profile of the external teeth is tapered such that, for example, tooth thickness, addendum circle diameter, etc., gradually decrease toward an open-end side of the externally toothed gear.

Even if the tooth profile of the external teeth portion is a three-dimensional tooth profile that changes along the tooth-trace direction, the small-diameter external teeth extension portion functions as a guide when the external teeth are inserted into the internal teeth of the internally toothed gear. Consequently, the work of assembling the externally toothed gear in the internally toothed gear is made easier.

A cup-shaped externally toothed gear is provided with a cylindrical barrel part capable of flexing in a radial direction, a diaphragm extending radially inward from one end of the cylindrical barrel part, and external teeth formed in an external peripheral surface portion on a side near an open end, which is another end of the cylindrical barrel part. A top-hat-shaped externally toothed gear is provided with a cylindrical barrel part capable of flexing in a radial direction, a diaphragm extending radially outward from one end of the cylindrical barrel part, and external teeth formed in an external peripheral surface portion on a side near an open end, which is another end of the cylindrical barrel part.

In this case, for example, the external teeth extension portion extends to the open end from the first end on the open-end side of the external teeth portion. Due to the external teeth extension portion being used as a guide, the assembly work of inserting the externally toothed gear into the internally toothed gear from the open-end side and causing the externally toothed gear to mesh with the internal teeth is made easier.

There are cases in which a cup-shaped externally toothed gear is inserted into and assembled in the internally toothed gear from the side of the cylindrical barrel part. The external teeth extension portion for guiding insertion is preferably formed in a diaphragm-side end portion of the external teeth so as to facilitate the assembly work. The external teeth extension portion for guiding insertion can also be formed in both tooth-trace-direction end portions of the external teeth.

The present invention can also be applied to a flat-type strain wave gearing. A flat-type strain wave gearing comprises a rigid first internally toothed gear, a rigid second internally toothed gear, a flexible externally toothed gear disposed coaxially on inner sides of the first and second internally toothed gears, and a wave generator fitted into an inner side of the externally toothed gear, in which the externally toothed gear is provided with a cylindrical barrel part capable of flexing in a radial direction and external teeth formed on an external peripheral surface of the cylindrical barrel part.

In this case, the external teeth include: a first external teeth portion capable of meshing with first internal teeth of the first internally toothed gear and a second external teeth portion capable of meshing with second internal teeth of the second internally toothed gear; an external teeth linking portion joining the first and second external teeth portions together; a first external teeth extension portion extending from an end of the first external teeth portion along a tooth-trace direction to one first open end of the cylindrical barrel part; and a second external teeth extension portion extending from an end of the second external teeth portion along the tooth-trace direction to another second open end of the cylindrical barrel part.

The external teeth linking portion is in a position set apart from the first and second internal teeth in a tooth-trace direction, the first external teeth extension portion is in a position set apart from the first internal teeth in the tooth-trace direction, and the second external teeth extension portion is in a position set apart from the second internal teeth in the tooth-trace direction. The tooth profile of the external teeth gradually changes from the first external teeth portion in the external teeth to an end of the first external teeth extension portion, and the tooth profile of the external teeth gradually changes from the second external teeth portion in the external teeth to an end of the second external teeth extension portion.

Furthermore, at least the addendum circle diameter in the first external teeth extension portion gradually decreases toward the first open end so that the first external teeth extension portion serves as a guide when the first external teeth are inserted into the first internal teeth. At least the addendum circle diameter in the second external teeth extension portion gradually decreases toward the second open end so that the second external teeth extension portion serves as a guide when the second external teeth are inserted into the second internal teeth.

Thus, the first external teeth extension portion is formed as a continuation of the end of the first external teeth portion, and the second external teeth extension portion is formed as a continuation of the end of the second external teeth portion. The first and second external teeth extension portions have tapered contours such that the addendum circle diameter gradually decreases toward the distal end. The work of assembling the first and second internally toothed gears on the externally toothed gear is made easier because the first and second external teeth extension portions function as guides when the first and second external teeth of the externally toothed gear are inserted into the first and second internal teeth.

Next, the present invention provides a cup-type strain wave gearing comprising a cup-shaped externally toothed gear, which is a molded article in which external teeth are integrally formed using a molding die, wherein the external teeth of the externally toothed gear include an external teeth portion capable of meshing with internal teeth of an internally toothed gear, and a first external teeth extension portion and second external teeth extension portion formed in positions set apart from the internal teeth in a tooth-trace direction. From an open-end side of the cup-shaped externally toothed gear and along a tooth-trace direction of the external teeth, the external teeth portion, the first external teeth extension portion, and the second external teeth extension portion are continuous in the tooth-trace direction in the stated order. A parting line mark of the molding die is positioned in a border between the first external teeth extension portion and the second external teeth extension portion, which do not mesh with the internal teeth.

The tooth profile of the external teeth gradually changes from the position of the parting line mark in the external teeth to the end on the open-end side of the external teeth portion, so that a predetermined draft for removing the molded article from the die is formed along the tooth trace direction in the external teeth. The tooth profile of the external teeth is tapered such that, for example, tooth thickness, addendum circle diameter, etc., gradually decrease toward an open-end side of the externally toothed gear. Furthermore, at least the addendum circle diameter in the second external teeth extension portion gradually decreases from the position of the parting line mark to a diaphragm-side end so that the second external teeth extension portion serves as a guide when the externally toothed gear is inserted into the internally toothed gear.

In the cup-shaped externally toothed gear, the first external teeth extension portion and the second external teeth extension portion are portions that do not mesh with the internal teeth of the internally toothed gear. Additionally, the parting line mark is formed in the border position of the first and second external teeth extension portions. An irregularity such as the level difference of the parting line mark does not adversely affect meshing of the external teeth of the externally toothed gear with the internal teeth of the internally toothed gear. Additionally, the narrowing second external teeth extension portion, in which the addendum circle diameter gradually decreases toward the diaphragm side, is formed in the diaphragm-side end of the external teeth of the externally toothed gear. Even when the tooth profile of the external teeth portion is a three-dimensional tooth profile that gradually changes along the tooth-trace direction, the small-diameter second external teeth extension portion functions as a guide when the external teeth are inserted into the internal teeth of the internally toothed gear. Consequently, the work of assembling the externally toothed gear in the internally toothed gear is made easier.

Next, in a top-hat-type strain wave gearing comprising a top-hat-shaped externally toothed gear, which is a molded article in which external teeth are integrally formed using a molding die, the externally toothed gear is inserted into and assembled in an internally toothed gear from an open-end side of the externally toothed gear. In the externally toothed gear of the top-hat-type strain wave gearing to which the present invention is applied, a first external teeth extension portion is formed in the external teeth as a continuation of a diaphragm-side end of an external teeth portion capable of meshing with internal teeth, and a second external teeth extension portion is formed in the external teeth as a continuation of an end of an external teeth portion on the open-end side. A parting line mark of the molding die is formed in a location where an end of the first external teeth extension portion is positioned in a cylindrical barrel part of the externally toothed gear.

The tooth profile of the external teeth is preferably gradually changed along the tooth-trace direction so that through the entire tooth-trace direction of the external teeth, a draft is formed in a die removal direction toward the open-end side. The second external teeth extension portion on the open-end side has a narrowing tapered contour such that the addendum circle diameter gradually decreases toward the open end. As a result, even if the external teeth portion of the external teeth meshing with the internal teeth has a three-dimensional tooth profile that gradually changes along the tooth-trace direction, the second external teeth extension portion functions as a guide and the work of inserting the externally toothed gear into the internally toothed gear is made easier.

Next, the present invention can also be applied to a strain wave gearing comprising a flat-shaped (cylindrical) externally toothed gear, which is a molded article in which external teeth are integrally formed using a molding die. In this case, the external teeth, which are formed on an external peripheral surface of a cylindrical barrel part of the externally toothed gear, include a first external teeth portion capable of meshing with first internal teeth of one first internally toothed gear, and a second external teeth portion capable of meshing with second internal teeth of another second internally toothed gear. A portion between the first external teeth portion and the second external teeth portion, set apart from a tooth-trace direction of both sets of internal teeth, joins the external teeth portions together via an external teeth linking portion. A parting line mark of the molding die is positioned in the external teeth linking portion.

A first external teeth extension portion is formed as a continuation of an end of the first external teeth portion. Similarly, a second external teeth extension portion is formed as a continuation of an end of the second external teeth portion. The first and second external teeth extension portions have tapered contours such that an addendum circle diameter gradually decreases toward a distal end. The work of assembling the first and second internally toothed gears on the externally toothed gear is made easier because the first and second external teeth extension portions function as guides when the first and second external teeth of the externally toothed gear are inserted into the first and second internal teeth.

BRIEF DESCRIPTION OF THE DRAWINGS

FIG. 3C is an explanatory drawing of another example of a flat-shaped externally toothed gear.

MODE FOR CARRYING OUT THE INVENTION

Embodiments of a strain wave gearing to which the present invention is applied are described below with reference to the drawings. The embodiments described below present applied examples of the present invention, and the present invention is not intended to be limited to the embodiments.

Embodiment 1

Figure 1B:
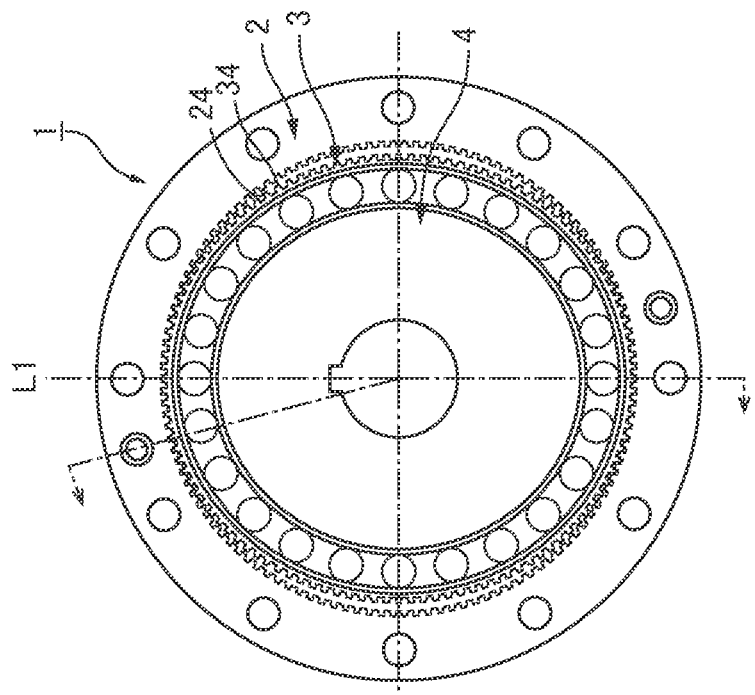
FIG. 1B is a front view of a cup-type strain wave gearing.
Figure 1A:
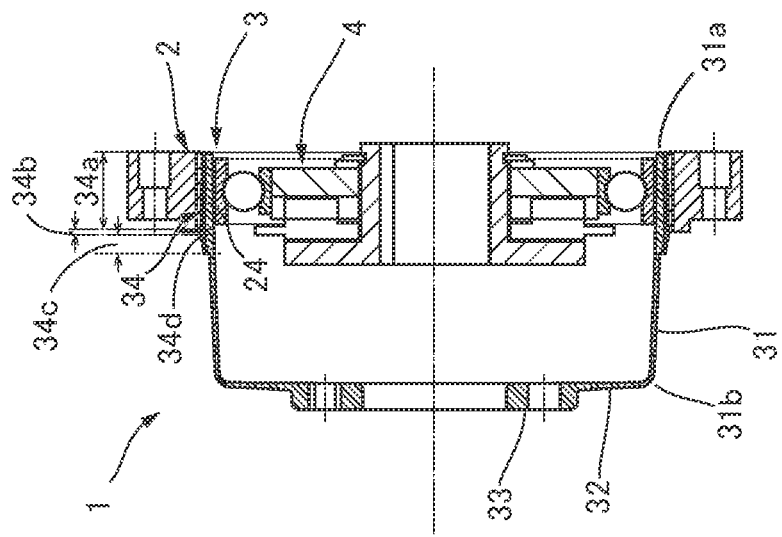
FIG. 1A is a longitudinal cross-sectional view of a cup-type strain wave gearing.
Figure 1D:
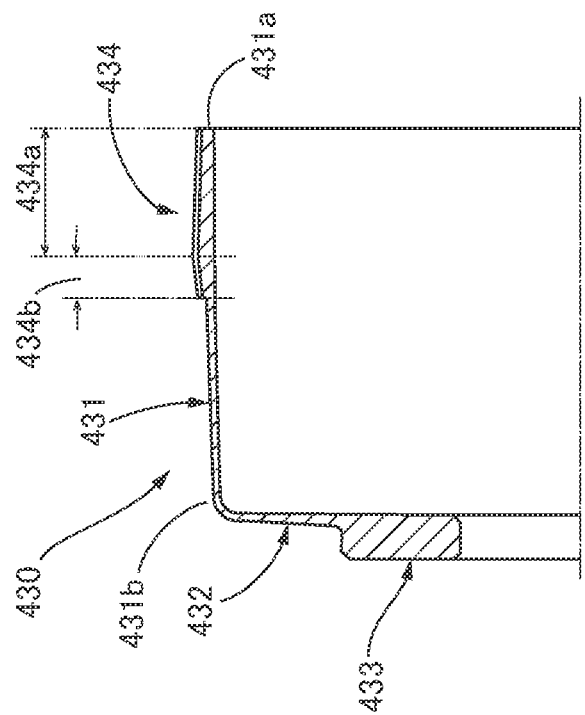
FIG. 1D is an explanatory drawing of another example of a cup-shaped externally toothed gear.
Figure 1C:
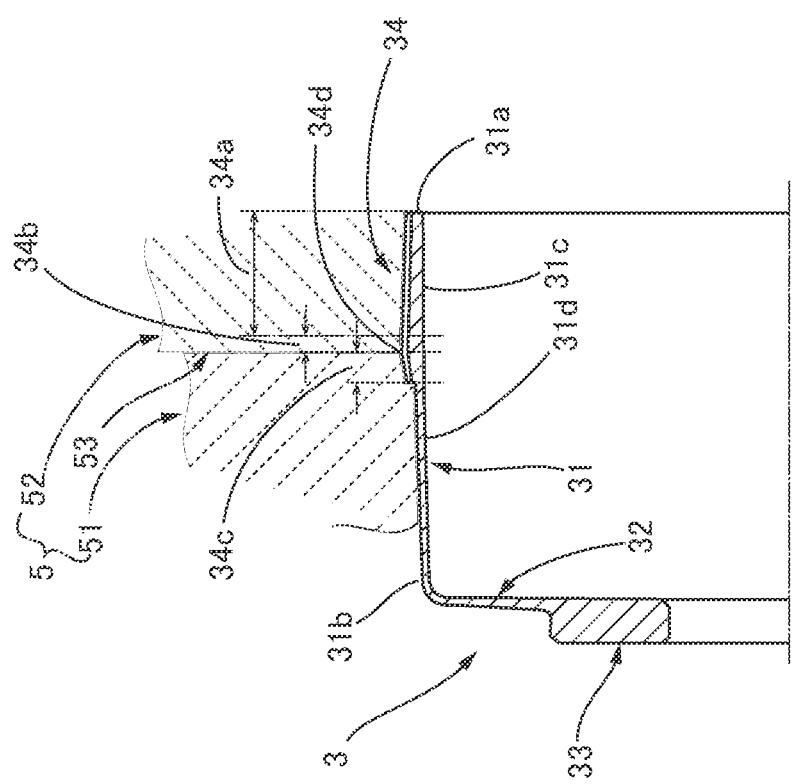
FIG. 1C is an explanatory drawing of a cup-shaped externally toothed gear.

FIG. 1A is a longitudinal cross-sectional view of a cup-type strain wave gearing according to Embodiment 1, FIG. 1B is a front view of the same, and FIG. 1C is an explanatory drawing of a cup-shaped externally toothed gear. A cup-type strain wave gearing 1 has an annular rigid internally toothed gear 2, a flexible externally toothed gear 3 coaxially disposed on an inner side of the internally toothed gear, and an ellipsoidally contoured wave generator 4 fitted into an inner side of the externally toothed gear. The internally toothed gear 2 and the externally toothed gear 3 are spur gears of the same module (m). The difference in the number of teeth between the two gears is 2n (n being a positive integer), the internally toothed gear 2 having the greater number. The portion of the externally toothed gear 3 where external teeth 34 are formed, are caused to flex into an ellipsoidal shape by the ellipsoidally contoured wave generator 4, and these teeth mesh with internal teeth 24 of the internally toothed gear 2 in both end portions in the direction of a long axis L1 of the ellipsoid. When the wave generator 4 is caused to rotate, the meshing positions of the gears 2, 3 move in a circumferential direction, and relative rotation occurs between the gears 2, 3, the rotation corresponding to the difference in the number of teeth between the gears.

The cup-shaped externally toothed gear 3 is provided with a flexible cylindrical barrel part 31, a diaphragm 32 extending radially inward as a continuation of a rear end 31$b$ which is one end of the barrel part, a rigid annular boss 33 continuous with an internal peripheral edge of the diaphragm 32, and external teeth 34 formed on an external peripheral surface portion of the cylindrical barrel part 31 on a side nearer to an open end 31a which is another end (front end). Due to the ellipsoidally contoured wave generator 4 fitted into an internal peripheral surface portion of an external teeth formation portion of the cylindrical barrel part 31, the amount of radially outward or inward flexure of the cylindrical barrel part 31 gradually increases from the rear end 31b on the diaphragm side toward the open end 31a.

The externally toothed gear 3 of the cup-type strain wave gearing 1 is a molded article in which at least the external teeth 34 are integrally formed in the cylindrical barrel part 31 using a molding die. For example, the externally toothed gear 3 is an injection-molded article of a thermoplastic resin. The internally toothed gear 2 can also similarly be a molded article.

The external teeth 34 of the externally toothed gear 3 shall now be described. The external teeth 34 include an external teeth portion 34a capable of meshing with the internal teeth 24 of the internally toothed gear 2, and a first external teeth extension portion 34b and a second external teeth extension portion 34c formed in positions set apart from the internal teeth 24 in the tooth-trace direction. The external teeth portion 34a, the first external teeth extension portion 34b, and the second external teeth extension portion 34c extend continuously in the order listed along the tooth-trace direction from the end of the external teeth 34 on the side near the open end 31a. When the externally toothed gear 3 has been inserted and assembled in the internally toothed gear 2, the external teeth portion 34a of the external teeth 34 faces the internal teeth 24. Conversely, the first and second external teeth extension portions 34b, 34c are in positions set apart from the internal teeth 24 in the tooth-trace direction and these portions do not mesh with the internal teeth 24.

A molding die 5 for forming the externally toothed gear 3 is configured from a pair of opening/closing dies 51 and 52, as is shown by, for example, the imaginary lines in FIG. 1C. When the opening/closing dies 51, 52 are closed, a cavity for externally toothed gear formation is formed therebetween. A parting line 53 of the opening/closing dies 51, 52 is set so as to be positioned in a border between the first external teeth extension portion 34b and the second external teeth extension portion 34c in a cavity portion for external teeth formation. As a result, after the externally toothed gear 3 has been removed from the die and deburred, a parting line mark 34d remains in the location of the border of the first and second external teeth extension portions 34b, 34c of the external teeth 34.

A tooth profile of the external teeth 34 is a three-dimensional tooth profile that gradually changes along the tooth-trace direction. In the present example, the tooth profile of the external teeth 34 gradually changes along the tooth-trace direction from the position of the parting line mark 34d to the end of the external teeth portion 34a on the side near the open end 31a so that a predetermined draft for removing the molded article from the die is formed in the external teeth 34. The tooth profile is tapered such that, for example, tooth thickness, addendum circle diameter, and root circle diameter gradually decrease toward the open end 31a.

Furthermore, a tooth profile of the second external teeth extension portion 34c is also a three-dimensional tooth profile that continuously and gradually changes from the parting line mark 34d toward the diaphragm side 32. In the present example, the tooth profile is tapered such that from the parting line mark 34d to the end on the diaphragm side, tooth depth remains the same and the addendum circle diameter and root circle diameter gradually decrease. Thus, the external teeth 34 are given a taper in the reverse direction with the parting line mark 34d as the border.

The internal peripheral surface shape of the cylindrical barrel part 31 of the externally toothed gear 3 is stipulated by, for example, an internal peripheral surface portion 31c having the same inner diameter from the side near the open end 31a, and an internal peripheral surface portion 31d continuing from the internal peripheral surface portion 31c and gradually decreasing in inner diameter toward the diaphragm 32.

The internally toothed gear 2, which is provided with internal teeth 24 that mesh with the external teeth portion 34a of the external teeth 34 having this shape, can also be fabricated as a molded article. The internal teeth 24 of the internally toothed gear 2 are made to have, for example, the same tooth profile in the tooth-trace direction. The internally toothed gear 2 can also be given a three-dimensional tooth profile having a slight draft for removal from the die in the tooth-trace direction.

In the external teeth 34 of the externally toothed gear 3 of the present example, the first and second external teeth extension portions 34b, 34c are portions that do not mesh with the internal teeth 24 of the internally toothed gear 2. Additionally, the parting line mark 34d is formed in the border of the first and second external teeth extension portions 34b, 34c. The first external teeth extension portion 34b, an irregularity such as the level difference of the parting line mark 34d, and the second external teeth extension portion 34c do not adversely affect meshing of the external teeth 34 of the externally toothed gear 3 with the internal teeth 24 of the internally toothed gear 2. Additionally, the narrowing second external teeth extension portion 34c, in which the addendum circle diameter gradually decreases toward the diaphragm side, is formed in the side of the diaphragm-side end of the external teeth 34 of the externally toothed gear 3. Therefore, even if the tooth profile of the external teeth portion 34a is a three-dimensional tooth profile that gradually changes along the tooth-trace direction, the small-diameter second external teeth extension portion 34c functions as a guide when the external teeth 34 are inserted into the internal teeth 24 of the internally toothed gear 2. Consequently, the assembly work of inserting the externally toothed gear 3 into the internally toothed gear 2 from the side near the diaphragm 32 is made easier.

(Other Example of Cup-Shaped Externally Toothed Gear)

The cup-shaped externally toothed gear 3 described above is a molded article in which the external teeth 34 are integrally formed at least in the cylindrical barrel part 31 using a molding die. An example of a cut-machined externally toothed gear that can be used instead of the externally toothed gear 3 shall now be described referring to FIG. 1D.

An externally toothed gear 430 is provided with a flexible cylindrical barrel part 431, a diaphragm 432 extending radially inward as a continuation of a rear end 431b which is one end of the barrel part, a rigid annular boss 433 continuous with an internal peripheral edge of the diaphragm 432, and external teeth 434 formed on an external peripheral surface portion of the cylindrical barrel part 431 on a side nearer to an open end 431a which is another end (front end).

The external teeth 434 include an external teeth portion 434a capable of meshing with the internal teeth of the internally toothed gear 2, and an external teeth extension portion 434b formed in a position set apart from the internal teeth 24 in the tooth-trace direction. The external teeth portion 434a and the external teeth extension portion 434b are formed continuously in the order listed along the tooth-trace direction from the end of the external teeth 434 on the side near the open end 431a. When the externally toothed gear 430 has been inserted and assembled in the internally toothed gear 2, the external teeth portion 434a of the external teeth 434 faces the internal teeth 24. Conversely, the external teeth extension portion 434b is in a position set apart from the internal teeth 24 in the tooth-trace direction, and this portion does not mesh with the internal teeth 24.

A tooth profile of the external teeth 434 is a three-dimensional tooth profile that gradually changes along the tooth-trace direction. In the present example, the tooth profile of the external teeth 434 continuously and gradually changes along the tooth-trace direction from the end of the external teeth portion 434a on the side near the diaphragm 432 to the end on the side near the open end 431a. The tooth profile is tapered such that, for example, tooth thickness, addendum circle diameter, and root circle diameter gradually decrease toward the open end 431a.

A tooth profile of the external teeth extension portion 434b is also a three-dimensional tooth profile that continuously and gradually changes from the end on the side near the external teeth portion 434a toward the diaphragm side 432. In the present example, the tooth profile is tapered such that tooth depth remains the same and the addendum circle diameter and root circle diameter gradually decrease. Thus, the external teeth 434 are given a taper in the reverse direction from the border position between the external teeth portion 434a and the external teeth extension portion 434b.

In the external teeth 434 of the externally toothed gear 430 of the present example, the external teeth extension portion 434b does not mesh with the internal teeth 24 of the internally toothed gear 2. Additionally, the narrowing external teeth extension portion 434b, in which the addendum circle diameter gradually decreases toward the diaphragm side 432, is formed in the side of the diaphragm 432-side end of the external teeth 434 of the externally toothed gear 430. Even if the tooth profile of the external teeth portion 434a is a three-dimensional tooth profile that gradually changes along the tooth-trace direction, the small-diameter external teeth extension portion 434b functions as a guide when the external teeth 434 are inserted into the internal teeth 24 of the internally toothed gear 2. Therefore, the assembly work of inserting the externally toothed gear 430 into the internally toothed gear 2 from the side near the diaphragm 432 is made easier.

Embodiment 2

Figure 2B:
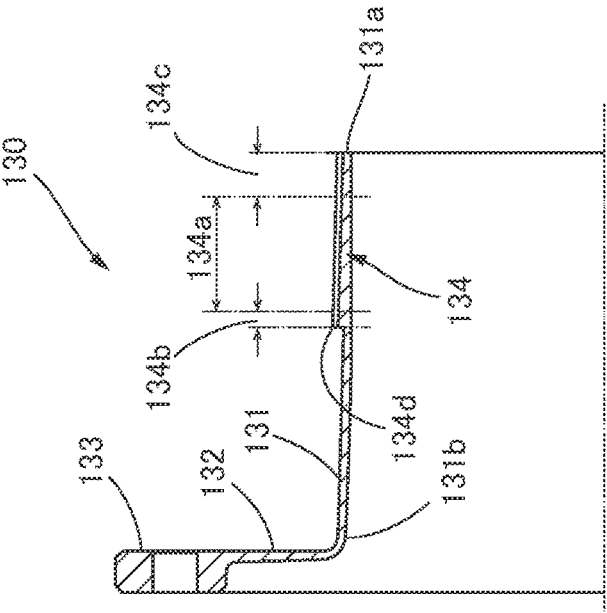
FIG. 2B is an explanatory drawing of a top-hat-shaped externally toothed gear.
Figure 2A:
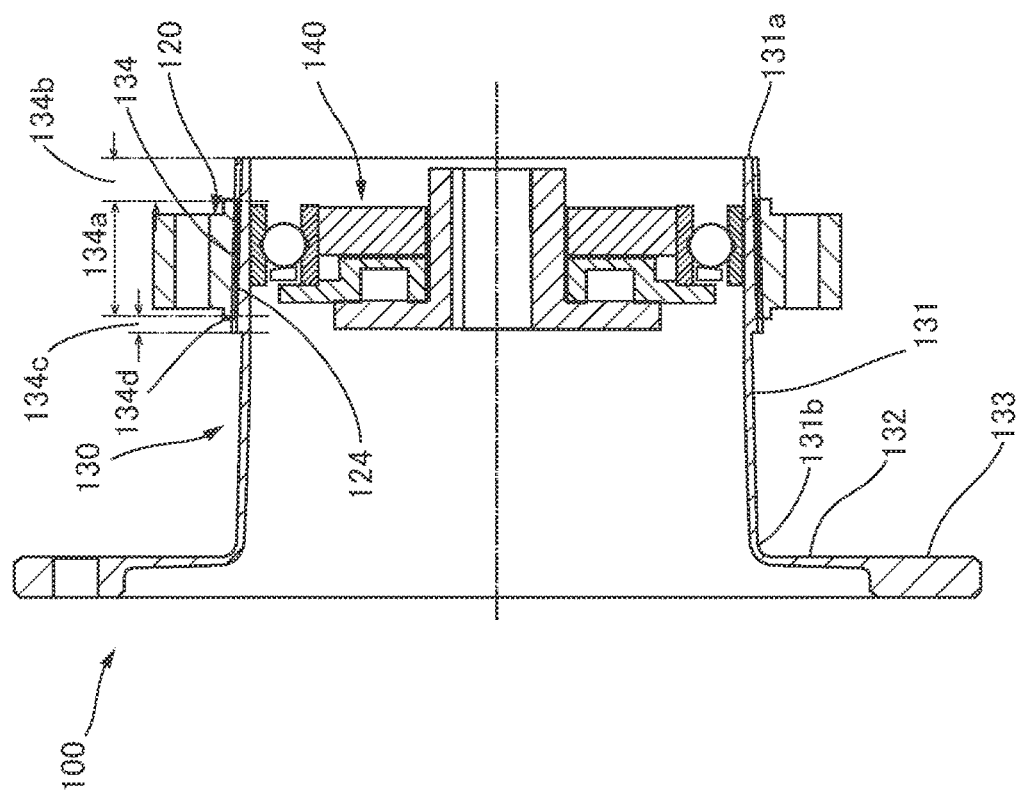
FIG. 2A is a longitudinal cross-sectional view of a top-hat-type strain wave gearing.

FIG. 2A is a longitudinal cross-sectional view of a top-hat-type strain wave gearing according to Embodiment 2, and FIG. 2B is an explanatory drawing of a top-hat-shaped externally toothed gear. A top-hat-type strain wave gearing 100 has an annular rigid internally toothed gear 120, a flexible externally toothed gear 130 coaxially disposed on an inner side of the internally toothed gear, and an ellipsoidally contoured wave generator 140 fitted into the inner side of the externally toothed gear. The internally toothed gear 120 and the externally toothed gear 130 are spur gears of the same module (m). The difference in the number of teeth between the two gears is 2n (n being a positive integer), the internally toothed gear 120 having the greater number. External teeth 134 of the externally toothed gear 130 are caused to flex into an ellipsoidal shape by the ellipsoidally contoured wave generator 140, and these teeth mesh with internal teeth 124 of the internally toothed gear 120 in both end portions in the direction of a long axis of the ellipsoid. When the wave generator 140 is caused to rotate, the meshing positions of the gears 120, 130 move in a circumferential direction, and relative rotation occurs between the gears 120, 130, the rotation corresponding to the difference in the number of teeth between the gears.

The top-hat-shaped externally toothed gear 130 is provided with a flexible cylindrical barrel part 131, a diaphragm 132 extending radially outward as a continuation of a rear end 131b which is one end of the barrel part, a rigid annular boss 133 continuous with an external peripheral edge of the diaphragm 132, and external teeth 134 formed on an external peripheral surface portion of the cylindrical barrel part 131 on a side nearer to an open end 131a which is another end (front end). Due to the ellipsoidally contoured wave generator 140 fitted into an internal peripheral surface portion of an external teeth formation portion of the cylindrical barrel part 131, the amount of radially outward or inward flexure of the cylindrical barrel part 131 gradually increases from the rear end 131b on the diaphragm side toward the open end 131a.

The externally toothed gear 130 of the top-hat-type strain wave gearing 100 is a molded article in which the external teeth 134 are integrally formed at least in the cylindrical barrel part 131 using a molding die. For example, the externally toothed gear 130 is an article injection-molded from a thermoplastic resin. The internally toothed gear 120 can also similarly be a molded article.

The external teeth 134 of the externally toothed gear 130 shall now be described. The external teeth 134 include an external teeth portion 134a capable of meshing with the internal teeth 124 of the internally toothed gear 120, and a first external teeth extension portion 134b and a second external teeth extension portion 134c formed in positions set apart from the internal teeth 124 in the tooth-trace direction. The second external teeth extension portion 134c, the external teeth portion 134a, and the first external teeth extension portion 134b are formed in the order listed along the tooth-trace direction from the end of the external teeth 134 on the side near the open end 131a. When the externally toothed gear 130 has been inserted and assembled in the internally toothed gear 120, the external teeth portion 134a of the external teeth 134 faces the internal teeth 124. Conversely, the first and second external teeth extension portions 134b, 134c are in positions set apart from the internal teeth 124 in the tooth-trace direction and these portions do not mesh with the internal teeth 124.

A molding die (not shown) of the externally toothed gear 130 is configured from a pair of opening/closing dies. When the opening/closing dies are closed, a cavity for externally toothed gear formation is formed therebetween. A parting line of the opening/closing dies is set so as to be positioned in a cavity portion for external teeth formation, in the diaphragm-side end of the first external teeth extension portion 134b in a location corresponding to the cylindrical barrel part 131. As a result, after the externally toothed gear 130 has been removed from the die, a parting line mark 134d remains in the end of the first external teeth extension portion 134b of the external teeth 134.

A tooth profile of the external teeth 134 is a three-dimensional tooth profile that gradually changes along the tooth-trace direction. In the present example, the tooth profile of the external teeth 134 continuously and gradually changes from the position of a parting line mark 134d to the end (open end 131a) of the second external teeth extension portion 134c in the external teeth 134 so that a predetermined draft for removing the molded article from the die is formed along the tooth-trace direction in the external teeth 134. The tooth profile is tapered such that, for example, tooth thickness, addendum circle diameter, and root circle diameter gradually decrease toward the open end 131a.

The internally toothed gear 120, which is provided with internal teeth 124 that mesh with the external teeth portion 134a of the external teeth 134 having this shape, can also be fabricated as a molded article. The internal teeth 124 of the internally toothed gear 120 are made to have, for example, the same tooth profile in the tooth-trace direction. The internally toothed gear can also be given a three-dimensional tooth profile having a slight draft for removal from the die in the tooth-trace direction.

In the external teeth 134 of the externally toothed gear 130 of the present example, the first external teeth extension portion 134b, an irregularity such as the level difference of the parting line mark 134d, and the second external teeth extension portion 134c do not adversely affect meshing of the external teeth 134 of the externally toothed gear 130 with the internal teeth 124 of the internally toothed gear 120. Additionally, the narrowing second external teeth extension portion 134c is formed in the side near the open end 131a of the external teeth 134 of the externally toothed gear 130. Even if a tooth profile of the external teeth portion 134a is a three-dimensional tooth profile that gradually changes along the tooth-trace direction, the small-diameter second external teeth extension portion 134c functions as a guide when the external teeth portion 134a is inserted into the internal teeth 124 of the internally toothed gear 120. Consequently, the assembly work of inserting the externally toothed gear 130 into the internally toothed gear 120 from the side near the open end 131a is made easier.

(Other Example of Externally Toothed Gear)

Figure 2C:
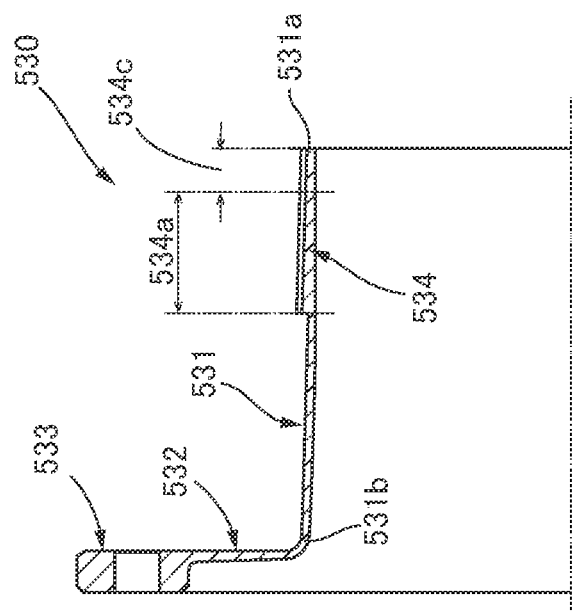
FIG. 2C is an explanatory drawing of another example of a top-hat-shaped externally toothed gear.

The top-hat-shaped externally toothed gear 130 described above is a molded article in which at least the external teeth 134 are integrally formed in the cylindrical barrel part 131 using a molding die. An example of a cut-machined externally toothed gear that can be used instead of the externally toothed gear 130 shall now be described with reference to FIG. 2C.

An externally toothed gear 530 is provided with a flexible cylindrical barrel part 531, a diaphragm 532 extending radially inward as a continuation of a rear end 531b which is one end of the barrel part, a rigid annular boss 533 continuous with an internal peripheral edge of the diaphragm 532, and external teeth 534 formed on an external peripheral surface portion of the cylindrical barrel part 531 on a side nearer to an open end 531a which is another end (front end).

The external teeth 534 include an external teeth portion 534a capable of meshing with the internal teeth 124 of the internally toothed gear 120, and an external teeth extension portion 534c formed in a position set apart from the internal teeth 124 in the tooth-trace direction. The external teeth extension portion 534c and the external teeth portion 534a extend continuously in the order listed along the tooth-trace direction from the end of the external teeth 534 on the side near the open end 531a. When the externally toothed gear 530 has been inserted and assembled in the internally toothed gear 120, the external teeth portion 534a of the external teeth 534 faces the internal teeth 124. Conversely, the external teeth extension portion 534c is in a position set apart from the internal teeth 124 in the tooth-trace direction, and this portion does not mesh with the internal teeth 124.

A tooth profile of the external teeth 534 is a three-dimensional tooth profile that gradually changes along the tooth-trace direction. In the external teeth 534 of the present example, the tooth profile of the external teeth 534 continuously and gradually changes along the tooth-trace direction from the diaphragm-side end to the end (the open end 531a) of the second external teeth extension portion 534c. The tooth profile is tapered such that, for example, tooth thickness, addendum circle diameter, and root circle diameter gradually decrease toward the open end 531a.

In the external teeth 534 of the externally toothed gear 530 of the present example, the narrowing external teeth extension portion 534c is formed in the side near the open end 531a. Even if a tooth profile of the external teeth portion 534a is a three-dimensional tooth profile that gradually changes along the tooth-trace direction, the small-diameter external teeth extension portion 534c functions as a guide when the external teeth portion 534a is inserted into the internal teeth of the internally toothed gear. Consequently, the assembly work of inserting the externally toothed gear 530 into the internally toothed gear 120 from the side near the open end 531a is made easier.

Embodiment 3

Figure 3B:
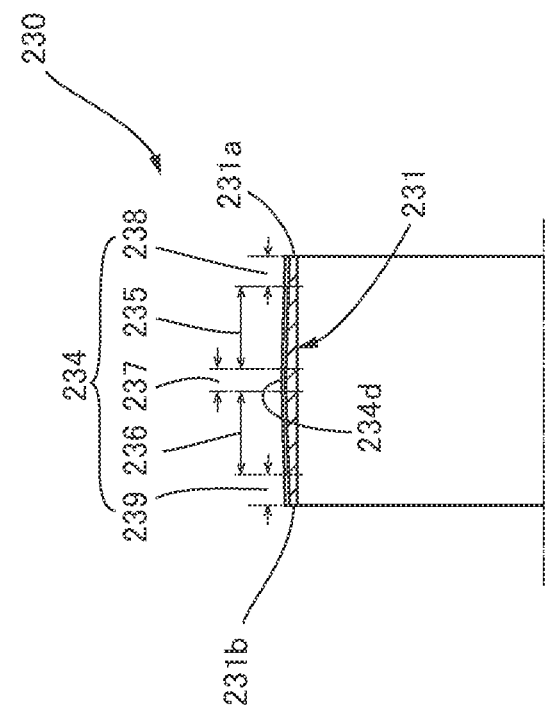
FIG. 3B is an explanatory drawing of a flat-shaped (cylindrical) externally toothed gear.
Figure 3A:
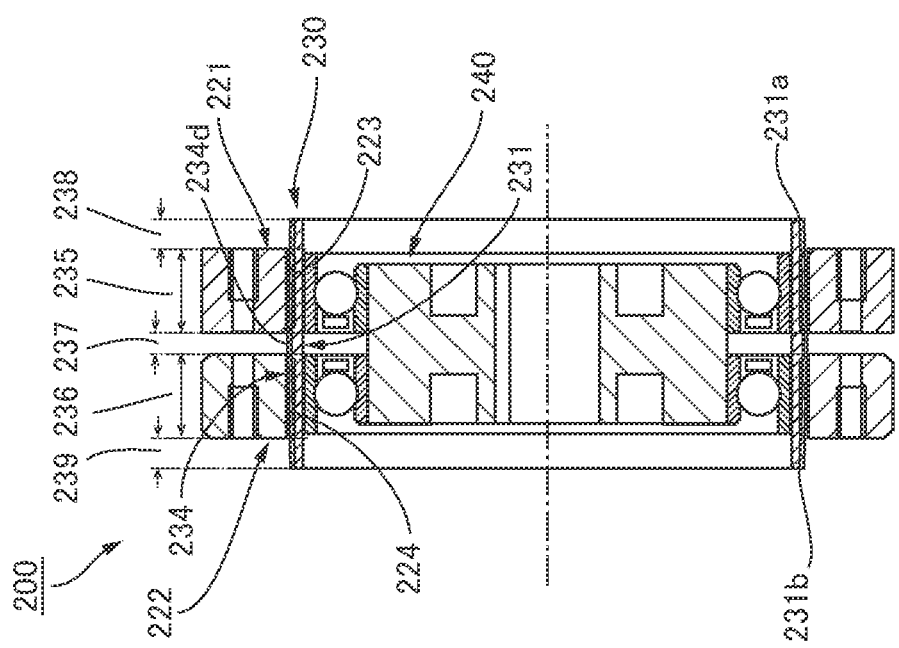
FIG. 3A is a longitudinal cross-sectional view of a flat-type strain wave gearing.

FIG. 3A is a longitudinal cross-sectional view of a flat-type strain wave gearing according to Embodiment 3, and FIG. 3B is an explanatory drawing of a flat-shaped (cylindrical) externally toothed gear. A flat-type strain wave gearing 200 has an annular rigid first internally toothed gear 221 and second internally toothed gear 222, a flexible externally toothed gear 230 coaxially disposed on inner sides of the internally toothed gears, and an ellipsoidally contoured wave generator 240 fitted into an inner side of the externally toothed gear. The first and second internally toothed gears 221, 222 and the externally toothed gear 230 are spur gears of the same module (m). The difference in the number of teeth between the first internally toothed gear 221 and the externally toothed gear 230 is 2n (n being a positive integer), the first internally toothed gear 221 having the greater number. The second internally toothed gear 222 and the externally toothed gear 230 have the same number of teeth and rotate integrally.

External teeth 234 of the externally toothed gear 230 are caused to flex into an ellipsoidal shape by the ellipsoidally contoured wave generator 240, and these teeth mesh with first internal teeth 223 and second internal teeth 224 of the first and second internally toothed gears 221, 222 in both end portions in the direction of a long axis of the ellipsoid. When the wave generator 240 is caused to rotate, the meshing positions of the externally toothed gear 230 with the first internally toothed gear 221 move in a circumferential direction, and relative rotation occurs between the gears 221, 230, the rotation corresponding to the difference in the number of teeth between the gears. The first internally toothed gear 221 is fixed so as to not rotate. In this case, the externally toothed gear 230 rotates and reduced rotation is outputted from the integrally rotating second internally toothed gear 222.

The externally toothed gear 230 of the flat-type strain wave gearing 200 is a molded article in which the external teeth 234 are integrally formed in a cylindrical barrel part 231 using a molding die. For example, the externally toothed gear is an injection-molded article of a thermoplastic resin. The first and second internally toothed gears 221, 222 can also similarly be molded articles.

The externally toothed gear 230 is provided with the flexible cylindrical barrel part 231 and the external teeth 234 formed on an external peripheral surface of the barrel part. The external teeth 234 include a first external teeth portion 235 capable of meshing with the first internal teeth 223 of the first internally toothed gear 221, and a second external teeth portion 236 capable of meshing with the second internal teeth 224 of the other second internally toothed gear 222. The first and second external teeth portions 235, 236, which are set apart from a tooth-trace direction of both sets of internal teeth, are joined together by an external teeth linking portion 237. The external teeth linking portion 237 is in a position set apart from both the first and second internal teeth 223, 224 in the tooth-trace direction. A parting line mark 234d of the molding die is positioned in the external teeth linking portion 237.

A first external teeth extension portion 238 is formed as a continuation of an end of the first external teeth portion 235. The first external teeth extension portion 238 is formed in a position set apart from the first internal teeth 223 in the tooth-trace direction. Similarly, a second external teeth extension portion 239 is formed as a continuation of an end of the second external teeth portion 236. The second external teeth extension portion 239 is formed in a position set apart from the second internal teeth 224 in the tooth-trace direction.

A molding die (not shown) of the externally toothed gear 230 is configured from, for example, a pair of opening/closing dies. A parting line of the molding die is set so as to be positioned in the external teeth linking portion 237 in a cavity portion for external teeth formation. As a result, after the externally toothed gear 230 has been molded, the parting line mark 234d remains in the external teeth linking portion 237 of the external teeth 234.

A tooth profile of the external teeth 234 is a three-dimensional tooth profile that gradually changes along the tooth-trace direction. In the external teeth 234 of the present example, the tooth profile of the external teeth 234 continuously and gradually changes from the position of the parting line mark 234d to an end of the first external teeth extension portion 238 on a side of the cylindrical barrel part near one open end 231a, so that a predetermined draft for removing the molded article from the die is formed along the tooth-trace direction. The tooth profile is tapered such that, for example, tooth thickness, addendum circle diameter, and root circle diameter gradually decrease toward the open end 231a. Similarly, the tooth profile of the external teeth 234 continuously and gradually changes from the position of the parting line mark 234d to an end of the second external teeth extension portion 239 on a side of the cylindrical barrel part 231 near another open end 231b. The tooth profile is tapered such that, for example, tooth thickness, addendum circle diameter, and root circle diameter gradually decrease toward the open end 231b.

The first internally toothed gear 221, which is provided with the first internal teeth 223 that mesh with the first external teeth portion 235 of the external teeth 234 having this shape, can be fabricated as a molded article. Additionally, the second internally toothed gear 222, which is provided with the second internal teeth 224 that mesh with the second external teeth portion 236 of the external teeth 234, can be fabricated as a molded article.

In the external teeth 234 of the externally toothed gear 230 of the present example, the external teeth linking portion 237, an irregularity such as the level difference of the parting line mark 234d, and the first and second external teeth extension portions 238, 239 do not adversely affect meshing of the externally toothed gear 230 with the first and second internally toothed gears 221, 222. Additionally, the narrowing first external teeth extension portion 238 is formed in the side near the open end 231a in the external teeth 234 of the externally toothed gear 230. Even if a tooth profile of the first external teeth portion 235 is a three-dimensional tooth profile that gradually changes along the tooth-trace direction, the small-diameter first external teeth extension portion 238 functions as a guide when the first external teeth portion 235 is inserted into the first internal teeth 223 of the first internally toothed gear 221. Similarly, even if a tooth profile of the second external teeth portion 236 is a three-dimensional tooth profile that gradually changes along the tooth-trace direction, the small-diameter second external teeth extension portion 239 functions as a guide when the second external teeth portion 236 is inserted into the second internal teeth 224 of the second internally toothed gear 222. Consequently, the assembly work of inserting the externally toothed gear 230 into the first and second internally toothed gears 221, 222 is made easier.

(Other Example of Externally Toothed Gear)

The externally toothed gear 230 described above is a molded article in which the external teeth 234 are integrally formed in the cylindrical barrel part 231 using a molding die. An example of a cut-machined externally toothed gear that can be used instead of the externally toothed gear 230 shall now be described with reference to FIG. 3C.

An externally toothed gear 630 is provided with a flexible cylindrical barrel part 631 and external teeth 634 formed on an external peripheral surface portion thereof. The external teeth 634 includes a first external teeth portion 635 capable of meshing with the first internal teeth 223 of the first internally toothed gear 221, and a second external teeth portion 636 capable of meshing with the second internal teeth 224 of the other second internally toothed gear 222. The first and second external teeth portions 635, 636, which are set apart from a tooth-trace direction of both sets of internal teeth, are joined together by an external teeth linking portion 637. The external teeth linking portion 637 is in a position set apart from both the first and second internal teeth 223, 224 in the tooth-trace direction.

A first external teeth extension portion 638 is formed as a continuation of an end of the first external teeth portion 635. The first external teeth extension portion 638 is formed in a position set apart from the first internal teeth 223 in the tooth-trace direction. Similarly, a second external teeth extension portion 639 is formed as a continuation of an end of the second external teeth portion 636. The second external teeth extension portion 639 is formed in a position set apart from the second internal teeth 224 in the tooth-trace direction.

A tooth profile of the external teeth 634 is a three-dimensional tooth profile that gradually changes along the tooth-trace direction. In the external teeth 634 of the present example, the tooth profile of the external teeth 634 continuously and gradually changes from a position 634d in the center of the external teeth linking portion 637 along the tooth-trace direction to an end of the first external teeth extension portion 638 on a side of the cylindrical barrel part near one open end 631a. The tooth profile is tapered such that, for example, tooth thickness, addendum circle diameter, and root circle diameter gradually decrease toward the open end 631a. Similarly, the tooth profile of the external teeth 634 continuously and gradually changes from a position in the center of the external teeth linking portion 637 along the tooth-trace direction to an end of the second external teeth extension portion 639 on a side of the cylindrical barrel part 631 near another open end 631b. The tooth profile is tapered such that, for example, tooth thickness, addendum circle diameter, and root circle diameter gradually decrease toward the open end 631b.

In the external teeth 634 of the externally toothed gear 630 of the present example, the narrowing first external teeth extension portion 638 is formed in the side near the one open end 631a. Even if a tooth profile of the first external teeth portion 635 is a three-dimensional tooth profile that gradually changes along the tooth-trace direction, the small-diameter first external teeth extension portion 638 functions as a guide when the first external teeth portion 635 is inserted into the first internal teeth 223 of the first internally toothed gear 221. Similarly, even if a tooth profile of the second external teeth portion 636 is a three-dimensional tooth profile that gradually changes along the tooth-trace direction, the small-diameter second external teeth extension portion 639 functions as a guide when the second external teeth portion 636 is inserted into the second internal teeth 224 of the second internally toothed gear 222. Consequently, the assembly work of inserting the externally toothed gear 630 into the first and second internally toothed gears 221, 222 is made easier.

The invention claimed is:

1. A strain wave gearing comprising:
a rigid internally toothed gear;
a flexible externally toothed gear disposed coaxially on an inner side of the internally toothed gear; and
a wave generator fitted into an inner side of the externally toothed gear,
wherein external teeth of the externally toothed gear have an external teeth portion capable of meshing with internal teeth of the internally toothed gear and an external teeth extension portion formed in a position set apart from the internal teeth in a tooth-trace direction;
the external teeth portion and the external teeth extension portion respectively have a three-dimensional tooth profile of which a tooth profile shape changes in the tooth-trace direction;
the external teeth extension portion extends in the tooth-trace direction at least as a continuation of a first end which is one end of the external teeth portion in the tooth-trace direction; and
the external teeth extension portion has a tapered tooth profile in which a tooth thickness, an addendum circle diameter and, a root circle diameter of the external teeth extension portion gradually decreases from the first end of the external teeth portion to a distal end of the external teeth extension portion so that the external teeth extension portion serves as a guide when the external teeth are inserted into the internal teeth.

2. The strain wave gearing according to claim 1, wherein the externally toothed gear has a cylindrical barrel part capable of flexing in a radial direction, and a diaphragm extending radially inward or outward from one end of the cylindrical barrel part;
the external teeth are formed in an external peripheral surface portion on a side of an open end which is another end of the cylindrical barrel part, and
the external teeth extension portion extends from the first end of the external teeth portion to the open end.

3. The strain wave gearing according to claim 1, wherein the externally toothed gear has a cylindrical barrel part capable of flexing in a radial direction and a diaphragm extending radially inward from one end of the cylindrical barrel part, in which the external teeth are formed in an external peripheral surface portion on a side of an open end which is another end of the cylindrical barrel part;
a first external teeth extension portion and a second external teeth extension portion are provided as the external teeth extension portion, in which the first external teeth extension portion extends as a continuation of the first end of the external teeth portion on a side of the open end to the open end, the first end, and the second external teeth extension portion extends as a continuation of a second end of the external teeth portion on a side of the diaphragm;
the first external teeth extension portion has a tapered tooth profile in which a tooth thickness, an addendum circle diameter, and a root circle diameter of the first external teeth extension portion gradually decreases from the first end of the external teeth portion to the open end; and
the second external teeth extension portion has a tapered tooth profile in which a tooth thickness, an addendum circle diameter, and a root circle diameter of the second external teeth extension portion gradually decreases from the second end of the external teeth portion to an end of the second external teeth extension portion on the side of the diaphragm.

4. A flat-type strain wave gearing comprising:
a rigid first internally toothed gear;
a rigid second internally toothed gear;
a flexible externally toothed gear disposed coaxially on inner sides of the first and second internally toothed gears; and
a wave generator fitted into an inner side of the externally toothed gear,
wherein the externally toothed gear is provided with a cylindrical barrel part capable of flexing in a radial direction and external teeth formed on an external peripheral surface of the cylindrical barrel part,
wherein the external teeth has:
a first external teeth portion capable of meshing with first internal teeth of the first internally toothed gear;
a second external teeth portion capable of meshing with second internal teeth of the second internally toothed gear;
an external teeth linking portion joining the first and second external teeth portions together;
a first external teeth extension portion extending from an end of the first external teeth portion along a tooth-trace direction to one first open end of the cylindrical barrel part; and
a second external teeth extension portion extending from an end of the second external teeth portion along the tooth-trace direction to another second open end of the cylindrical barrel part, and
wherein the external teeth linking portion is in a position set apart from the first and second internal teeth in the tooth-trace direction, the first external teeth extension portion is in a position set apart from the first internal teeth in the tooth-trace direction, and the second external teeth extension portion is in a position set apart from the second internal teeth in the tooth-trace direction;
a tooth profile of the external teeth gradually changes from the first external teeth portion of the external teeth to an end of the first external teeth extension portion;
the tooth profile of the external teeth gradually changes from the second external teeth portion of the external teeth to an end of the second external teeth extension portion;
at least an addendum circle diameter of the first external teeth extension portion gradually decreases toward the first open end so that the first external teeth extension portion serves as a guide when the first external teeth are inserted into the first internal teeth; and
at least an addendum circle diameter of the second external teeth extension portion gradually decreases toward the second open end so that the second external teeth extension portion serves as a guide when the second external teeth are inserted into the second internal teeth.

5. A strain wave gearing comprising:
a rigid internally toothed gear;
a flexible externally toothed gear disposed coaxially on an inner side of the internally toothed gear; and
a wave generator fitted into an inner side of the externally toothed gear,
wherein the externally toothed gear has: a cylindrical barrel part capable of flexing in a radial direction; a diaphragm extending radially inward from one end of the cylindrical barrel part; and external teeth formed in an external peripheral surface portion on a side of an open end which is another end of the cylindrical barrel part, and
the externally toothed gear is a molded article in which external teeth are integrally formed using a molding die,
wherein the external teeth of the externally toothed gear have an external teeth portion capable of meshing with internal teeth of an internally toothed gear, and a first external teeth extension portion and second external teeth extension portion formed in positions set apart from the internal teeth in a tooth-trace direction;
the first external teeth extension portion extends in the tooth-trace direction as a continuation of an end of the external teeth portion on a side of the diaphragm;
the second external teeth extension portion extends in the tooth-trace direction as a continuation of an end of the first external teeth extension portion on the side of the diaphragm;
a parting line mark of the molding die is positioned in a border between the first external teeth extension portion and the second external teeth extension portion;
a tooth profile of the external teeth gradually changes from a position of the parting line mark to an end of the external teeth portion on a side of the open end, so that a predetermined draft for removing the molded article from the die is formed along the tooth trace direction in the external teeth; and
at least an addendum circle diameter of the second external teeth extension portion gradually decreases from the position of the parting line mark to an end of the second external teeth extension portion on the side of the diaphragm so that the second external teeth extension portion serves as a guide when the external teeth are inserted into the internal teeth.

6. A strain wave gearing comprising:
a rigid internally toothed gear;
a flexible externally toothed gear disposed coaxially on an inner side of the internally toothed gear; and
a wave generator fitted into an inner side of the externally toothed gear,
wherein the externally toothed gear has: a cylindrical barrel part capable of flexing in a radial direction; a diaphragm extending radially outward from one end of the cylindrical barrel part; and external teeth formed in an external peripheral surface portion on a side of an open end which is another end of the cylindrical barrel part, and
the externally toothed gear is a molded article in which external teeth are integrally formed using a molding die,
wherein the external teeth of the externally toothed gear have an external teeth portion capable of meshing with internal teeth of an internally toothed gear, and a first external teeth extension portion and a second external teeth extension portion, the first and second external teeth extension portions being formed in positions set apart from the internal teeth in a tooth-trace direction;
the first external teeth extension portion extends in the tooth-trace direction as a continuation of an end of the external teeth portion on a side of the diaphragm;
the second external teeth extension portion extends in the tooth-trace direction as a continuation of an end of the external teeth portion on the side of the open end to the open end;
a parting line mark of the molding die is positioned in a diaphragm-side end section of the first external teeth extension portion of the cylindrical barrel part;
a tooth profile of the external teeth gradually changes from a diaphragm-side end of the external teeth to an open-end-side end thereof, so that a predetermined draft for removing the molded article from the die is formed along the tooth trace direction in the external teeth; and
at least an addendum circle diameter of the second external teeth extension portion gradually decreases toward the open end so that the second external teeth extension portion serves as a guide when the external teeth are inserted into the internal teeth.

7. A strain wave gearing comprising:
a rigid first internally toothed gear;
a rigid second internally toothed gear;
a flexible externally toothed gear disposed coaxially on inner sides of the first and second internally toothed gears; and
a wave generator fitted into an inner side of the externally toothed gear,
wherein the externally toothed gear is provided with a cylindrical barrel part capable of flexing in a radial direction and external teeth formed on an external peripheral surface of the cylindrical barrel part; and
the externally toothed gear is a molded article in which the external teeth are integrally formed using a molding die,
wherein the external teeth has:
a first external teeth portion capable of meshing with first internal teeth of the first internally toothed gear;
a second external teeth portion capable of meshing with second internal teeth of the second internally toothed gear;
an external teeth linking portion joining the first and second external teeth portions together;
a first external teeth extension portion extending in a tooth-trace direction from an end of the first external teeth portion to a first open end of the cylindrical barrel part; and
a second external teeth extension portion extending in the tooth-trace direction from an end of the second external teeth portion to a second open end of the cylindrical barrel part,
wherein the external teeth linking portion is in a position set apart from the first and second internal teeth in the tooth-trace direction, the first external teeth extension portion is in a position set apart from the first internal teeth in the tooth-trace direction, and the second external teeth extension portion is in a position set apart from the second internal teeth in the tooth-trace direction;
wherein a parting line mark of the molding die is positioned in the external teeth linking portion;

a tooth profile of the external teeth gradually changes from the parting line mark of the external teeth to an end of the first external teeth extension portion, so that a first draft for removing the molded article from the die is formed;

the tooth profile of the external teeth gradually changes from the parting line mark of the external teeth to an end of the second external teeth extension portion, so that a second draft for removing the molded article from the die is formed, the second draft being opposite to the first draft;

at least an addendum circle diameter of the first external teeth extension portion gradually decreases toward the first open end so that the first external teeth extension portion serves as a guide when the first external teeth are inserted into the first internal teeth; and at least an addendum circle diameter of the second external teeth extension portion gradually decreases toward the second open end so that the second external teeth extension portion serves as a guide when the second external teeth are inserted into the second internal teeth.

\* \* \* \* \*